Dec. 12, 1961           J. HECHINGER          3,012,372
METHOD OF PROPAGATING OF FRUIT TREES ENTIRELY
GROWING ON THEIR OWN ROOTS
Filed Feb. 5, 1960
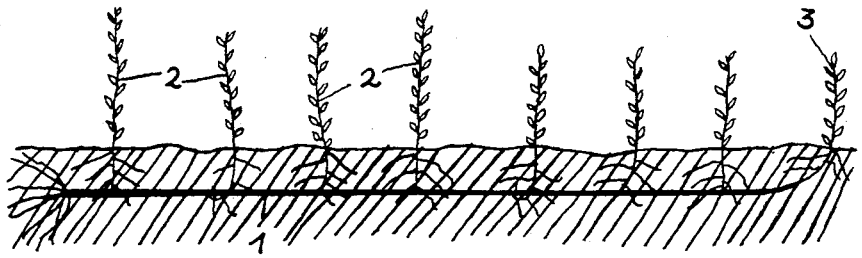

United States Patent Office 3,012,372
Patented Dec. 12, 1961

3,012,372
METHOD OF PROPAGATING OF FRUIT TREES ENTIRELY GROWING ON THEIR OWN ROOTS
Josef Hechinger, Waizenbach, Post Vilshofen, Germany
Filed Feb. 5, 1960, Ser. No. 6,942
2 Claims. (Cl. 47—58)

The invention relates to a method of propagating fruit trees, such as apples, pears, plums, cherries, peaches, etc., which grow on their own root system. Fruit trees grown on their own roots have the great advantage that they are able to rejuvenate and regenerate, producing only desirable wood, in case of severe damages caused by frost or other factors. These fruit trees from their own root system can produce any common form, such as dwarf, semi-dwarf and standard trees, but are especially adapted for the production of hedges or living fences. Such hedges have the advantage of making cultivation, especially harvesting, less strenuous. They also produce larger crops.

The practice of layering, that is bending of tree branches to the ground, in order to promote rooting at the location of contact with the soil, is well-known. But in this practice the length of the branches from the trunk to the ground is lost, which naturally increases with the size of the tree or the greater distance to the ground. Also it takes considerable time before such a branch can be bent down for rooting in the earth.

The object of the invention is to provide a procedure according to which a normally grafted stem of a tree is placed into the soil in a position which is approximately parallel to the surface of the ground, with its side shoots and tip bent upwards, and such side shoots and tip are separated from the stem as soon as they have produced roots. They are then lined out in the normal manner in the nursery. These side shoots and tip gradually form their own root systems in the soil so that each side shoot and tip eventually becomes the main shoot of a new plant. Since each of these shoots forms its own roots, the entire plant is of scion-wood.

Methods embodying the present invention for propagation of fruit trees growing entirely on their own roots are hereinafter described in detail with reference to the accompanying drawing, wherein the single view illustrates an intermediate step in the method.

As the first step, stock plants are either budded or grafted once or twice with the desired variety. For economical reasons it is advisable to perform the grafting or budding at two different locations on the stem, so that each stem bears two new scion shoots.

The further development can be accomplished in two ways. One may allow the scion shoots to develop without any pruning for one or two years. Then the plant is taken out from the soil and the stock is split along its entire length, if it has borne two main scion shoots. Each main shoot of the split stock is placed at least 20 cm. (that is, 8″) below the surface of the soil. The drawing shows such a main shoot 1 after having been placed into the soil. The side shoots 2 and the tip 3 of the main shoot are bent vertically upwards. It is good practice to mound all the side shoots and the tip in their vertical position. If water shoots should develop from the stock-part, they have to be removed immediately.

In accordance with a second method, the shoots are mounted according to their stage of development instead of letting the shoots grow unrestrained from the location of the graft. Mounting has to be absolutely done according to the rate of growth of the tree, and it has to be started as early as possible in order to cause the formation of an adequate root system. Formation of roots can be promoted by girdling or notching at the base of the stem. After 4 or 5 years, the rooted shoots can be separated from the stock, so that the scion is entirely dependent upon its own roots and no water shoots from the stock can be formed. After removal of the stock, the scion shoot is placed into the soil in the same manner as described above in the first example and as shown in the drawing. While the scion shoot can be embedded after two years when the stock plants are initially cultivated in accordance with the first described method, it will take four to five years, when done according to the second method.

The side shoots 2 and tip 3, bent upwards, are separated from the stem after about four to six years according to the rooting which depends very much upon the variety. They are then lined out in the nursery for development of a more complete root system. As soon as the plants have formed an adequate root system, they can be planted out in the orchard. Naturally they can be used for the production of dwarf, semi-dwarf or standard tree forms, and other common types. But it has been proved that those plants are extremely well suited for fruit hedges which produce better crops and make harvesting easier because of their size. Thus one can use them for fruit hedges as well as living fences. In this manner they can be used for two purposes.

But it is especially important to consider the fact that they grow completely on their own roots, and that in case of severe damage to the upper parts, caused by frost or other factors, a complete rejuvenation and regeneration of the lost parts from their own roots is possible.

I claim:
1. A method of propagating fruit trees having their own root systems, comprising grafting a stock plant to produce at least one main scion shoot having substantial numbers of side shoots and a tip, placing said main scion shoot in the soil substantially parallel to the surface of the soil and at a depth of at least 8 inches below said surface with said side shoots and tip of the main scion shoot being bent vertically upward, separating said side shoots and tip from said main shoot after said side shoots and tip have developed independent root systems, and replanting the separated, rooted side shoots and tip in a nursery.

2. A method as in claim 1; wherein said stock plant is grafted at two different locations to bear two main scion shoots each having side shoots and a tip, and said stock plant is split along its length to separate the main scion shoots which are then individually placed in the soil.

References Cited in the file of this patent

FOREIGN PATENTS

| | | |
|---|---|---|
| 76,678 | Czechoslovakia | June 15, 1948 |
| 582,983 | Germany | Aug. 26, 1933 |